US011372800B2

(12) United States Patent
Li (10) Patent No.: US 11,372,800 B2
(45) Date of Patent: Jun. 28, 2022

(54) SYSTEM ON CHIP COMPRISING A PLURALITY OF CENTRAL PROCESSING UNITS WHOSE MAILBOXES ARE SET IN TIGHTLY-COUPLED MEMORIES (71) Applicant: Silicon Motion, Inc., Hsinchu County (TW)

(72) Inventor: An-Pang Li, New Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/071,996

(22) Filed: Oct. 15, 2020

(65) Prior Publication Data
US 2022/0121614 A1 Apr. 21, 2022

(51) Int. Cl.
*G06F 15/167* (2006.01)
*G06F 15/78* (2006.01)
*G06F 13/38* (2006.01)
*G06F 13/16* (2006.01)
*G06F 13/40* (2006.01)

(52) U.S. Cl.
CPC ........ *G06F 15/167* (2013.01); *G06F 13/1668* (2013.01); *G06F 13/387* (2013.01); *G06F 13/4004* (2013.01); *G06F 15/7807* (2013.01)

(58) Field of Classification Search
CPC ......... G06F 21/57; G06F 21/72; G06F 21/575
USPC ....................................................... 711/147
See application file for complete search history.

(56) References Cited

U.S. PATENT DOCUMENTS

| 5,210,828 | A  | * | 5/1993  | Bolan       | G06F 15/167 |
|           |    |   |         |             | 709/214     |
| 6,629,152 | B2 | * | 9/2003  | Kingsbury   | G06F 9/544  |
|           |    |   |         |             | 719/313     |
| 7,496,917 | B2 | * | 2/2009  | Brokenshire | G06F 9/4843 |
|           |    |   |         |             | 709/206     |
| 7,631,150 | B2 | * | 12/2009 | Pong        | G06F 12/082 |
|           |    |   |         |             | 711/147     |
| 8,635,412 | B1 | * | 1/2014  | Wilshire    | G06F 13/28  |
|           |    |   |         |             | 711/147     |
| 2003/0088626 | A1 | * | 5/2003 | Gupta     | G06F 15/16  |
|           |    |   |         |             | 709/206     |
| 2008/0086626 | A1 |   | 4/2008 | Jones     |             |

(Continued)

FOREIGN PATENT DOCUMENTS

TW    201643729 A    12/2016

*Primary Examiner* — Titus Wong
(74) *Attorney, Agent, or Firm* — Winston Hsu (57) ABSTRACT

The present invention provides a SoC including a first CPU, a first tightly-coupled memory, a second CPU and a second tightly-coupled memory is disclosed. The first CPU includes a first core circuit, a first level one memory interface and a first level two memory interface. The first tightly-coupled memory is directly coupled to the first level one memory interface, and the first tightly-coupled memory includes a first mailbox. The second CPU includes a second core circuit, a second level one memory interface and a second level two memory interface. The second tightly-coupled memory is directly coupled to the second level one memory interface, and the second tightly-coupled memory includes a second mailbox. When the first CPU sends a command to the second mailbox within the second tightly-coupled memory, the second core circuit directly reads the command from the second mailbox, without going through the second level two memory interface.

10 Claims, 5 Drawing Sheets

(56) References Cited

U.S. PATENT DOCUMENTS

2009/0210691 A1* 8/2009 Im ........................ G06F 9/4405
  713/2
2010/0115195 A1* 5/2010 Pong ................... G06F 13/1605
  711/104

* cited by examiner

SYSTEM ON CHIP COMPRISING A PLURALITY OF CENTRAL PROCESSING UNITS WHOSE MAILBOXES ARE SET IN TIGHTLY-COUPLED MEMORIES

BACKGROUND OF THE INVENTION

1. Field of the Invention

The present invention relates to a system on chip (SoC) comprising a plurality of central processing units (CPUs).

2. Description of the Prior Art

In a conventional SoC comprising a plurality of CPUs, each CPU has its own mailbox for receiving messages or commands from the other CPU(s). Taking the SoC having Advanced reduced instruction set computing (RISC) Machine (ARM) structure as an example, the CPUs are communicated with each other by an advanced extensible interface (AXI) interconnect, an interface between the CPU and its own mailbox is an advanced high performance bus (AHB), and the CPU needs to communicate with the mailbox and/or other peripheral memory/register via the AHB bridge. In the above structure, when a first CPU transmits a message to the mailbox of a second CPU via the AXI interconnect, and the mailbox sends an interrupt signal to the second CPU to notify the second CPU to read the message, the second CPU needs to send a read command to the mailbox via the AHB bridge that requires an interface conversion, and the interface conversion in the AHB bridge means a longer signal delay, that is the inefficiency of the SoC may be obvious in a case of frequent communications between the CPUs.

SUMMARY OF THE INVENTION

It is therefore an objective of the present invention to provide a SoC, which designs the mailbox in the level one memory system, to solve the above-mentioned problem.

According to one embodiment of the present invention, a SoC comprising a first CPU, a first tightly-coupled memory, a second CPU and a second tightly-coupled memory is disclosed. The first CPU comprises a first core circuit, a first level one memory interface and a first level two memory interface. The first tightly-coupled memory is directly coupled to the first level one memory interface, and the first tightly-coupled memory comprises a first mailbox. The second CPU comprises a second core circuit, a second level one memory interface and a second level two memory interface. The second tightly-coupled memory is directly coupled to the second level one memory interface, and the second tightly-coupled memory comprises a second mailbox. When the first CPU sends a command to the second mailbox within the second tightly-coupled memory, the second core circuit directly reads the command from the second mailbox, without going through the second level two memory interface.

According to another embodiment of the present invention, a SoC comprising a first CPU, a first tightly-coupled memory, a second CPU, a second tightly-coupled memory and a flash memory controller is disclosed. The first CPU comprises a first core circuit, a first level one memory interface and a first level two memory interface. The first tightly-coupled memory is directly coupled to the first level one memory interface, and the first tightly-coupled memory comprises a first mailbox. The second CPU comprises a second core circuit, a second level one memory interface and a second level two memory interface. The second tightly-coupled memory is directly coupled to the second level one memory interface, and the second tightly-coupled memory comprises a second mailbox. The flash memory controller is configured to access a flash memory module external to the SoC. When first CPU sends an access command to the second mailbox within the second tightly-coupled memory, the second core circuit directly reads the access command from the second mailbox, without going through the second level two memory interface; and the second core circuit further sends a command corresponding to the access command to the flash memory controller, for controlling the flash memory controller to access the flash memory module.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
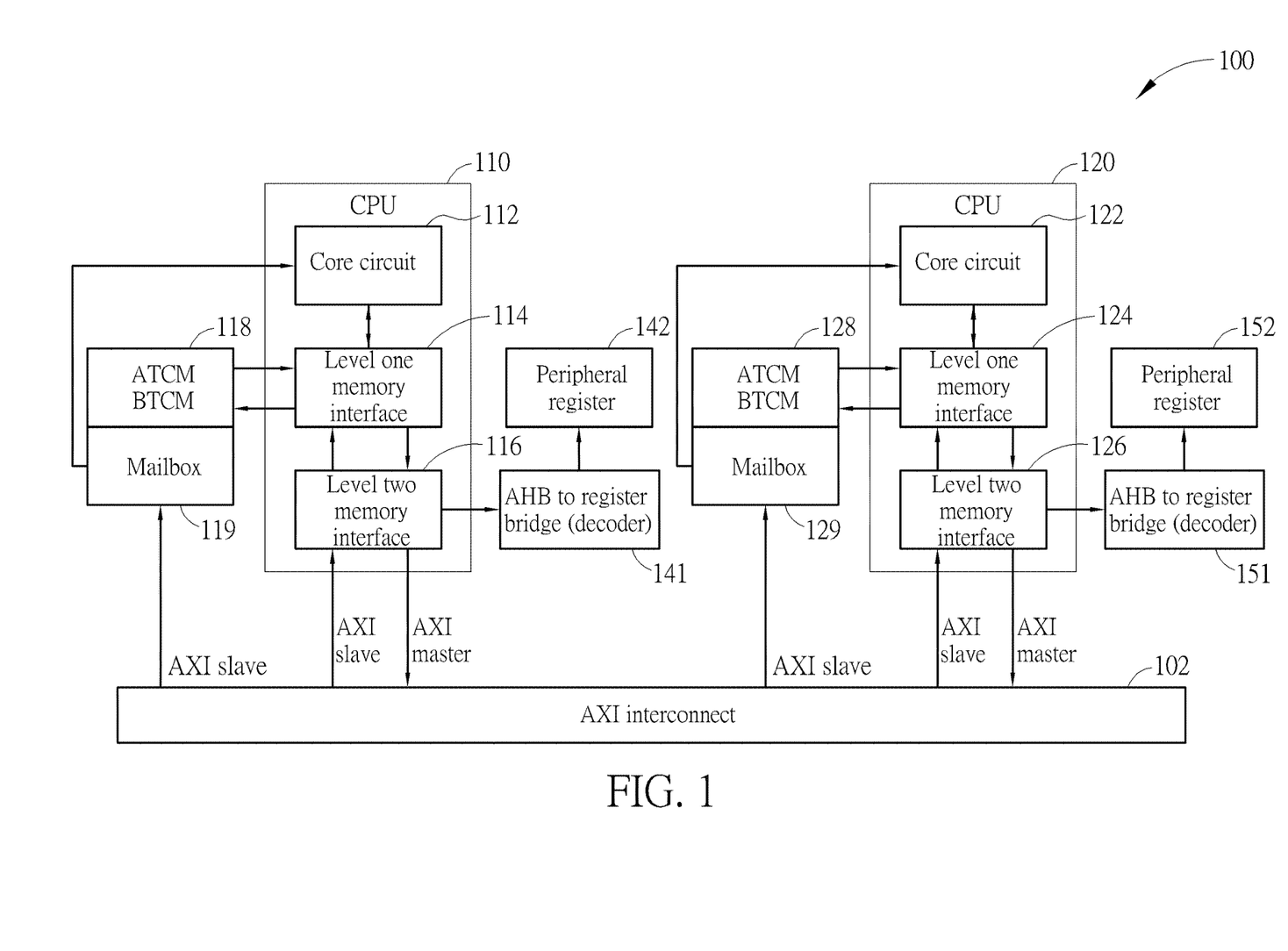
FIG. 1 is a diagram illustrating a SoC according to one embodiment of the present invention.

FIG. 1 is a diagram illustrating a SoC 100 according to one embodiment of the present invention. As shown in FIG. 1, the SoC 100 comprises a CPU 110, a tightly-coupled memory (TCM) comprising a memory space named ATCM and BTCM 118 and a mailbox 119, an AHB to resistor bridge (decoder) 141 and a peripheral register 142, wherein the CPU 110 comprises a core circuit 112, a level one memory interface 114 and a level two memory interface 116. In addition, the SoC 110 further comprises a CPU 120, a TCM comprising a memory space named ATCM and BTCM 128 and a mailbox 129, an AHB to resistor bridge (decoder) 151 and a peripheral register 152, wherein the CPU 120 comprises a core circuit 122, a level one memory interface 124 and a level two memory interface 126. In this embodiment, the TCM is designed to provide low latency memory that can be used by the processor without the unpredictability that is a feature of caches, and the TCM can be directly accessed by the core circuit 112/122 through the level one memory interface 114/124 without going through the level two memory interface 116/126. In one embodiment, the TCM may be built in the CPU 110/120. The SoC further comprises a bus for communications between the CPU 110 and the CPU 120, wherein an AXI interconnect 102 serves as the bus in this embodiment.

In the operation of the SoC 100, the core circuit 112 can directly access the ATCM and BTCM 118 and the mailbox 119 via the level one memory system 114, but the core circuit 112 needs to access the peripheral register 142 via the level two memory interface 116, and the level two memory interface 116 is required for the core circuit 112 to access the other components via the AXI interconnect 102. In this embodiment, the level two memory interface 116 may be an AHB interface that performs protocol conversion and address mapping, wherein the protocol conversion and address mapping mean a longer signal delay. Therefore, by designing the mailbox 119 within the TCM that can be directly accessed by the core circuit 112, the CPU 110 can communicate with other components with higher efficiency. Similarly, the core circuit 122 can directly access the ATCM and BTCM 128 and the mailbox 129 via the level one memory system 124, but the core circuit 122 needs to access the peripheral register 152 via the level two memory interface 126, and the level two memory interface 126 is required for the core circuit 122 to access the other components via the AXI interconnect 102. In this embodiment, the level two memory interface 126 may be the AHB interface that performs protocol conversion and address mapping, wherein the protocol conversion and address mapping mean a longer signal delay. Therefore, by designing the mailbox 129 within the TCM that can be directly accessed by the core circuit 122, the CPU 120 can communicate with other components with higher efficiency.

Specifically, if the CPU 120 needs to send a command to the CPU 110, the core circuit 122 sends the command to the AXI interconnect 102 via the level one memory interface 124 and the level two memory interface 126, and the command from the CPU 120 is stored in the mailbox 119. After the mailbox 119 receives the command from the CPU 120, the mailbox 119 sends an interrupt signal to notify the core circuit 112. After receiving the interrupt signal from the mailbox 119, the core circuit 112 reads the command stored in the mailbox 119 via the level one memory interface 114 to perform an operation corresponding to the command. In this embodiment, because the level one memory interface 114 does not need any register for the core circuit 112 to access the mailbox 119, the core circuit 112 can obtain the command from the CPU 120 efficiently. Similarly, if the CPU 110 needs to send a command to the CPU 120, the core circuit 112 sends the command to the AXI interconnect 102 via the level one memory interface 114 and the level two memory interface 116, and the command from the CPU 110 is stored in the mailbox 129. After the mailbox 129 receives the command from the CPU 110, the mailbox 129 sends an interrupt signal to notify the core circuit 122. After receiving the interrupt signal from the mailbox 129, the core circuit 122 reads the command stored in the mailbox 129 via the level one memory interface 124 to perform an operation corresponding to the command. In this embodiment, because the level one memory interface 124 does not need any register for the core circuit 122 to access the mailbox 129, the core circuit 122 can obtain the command from the CPU 110 efficiently.

Figure 2:
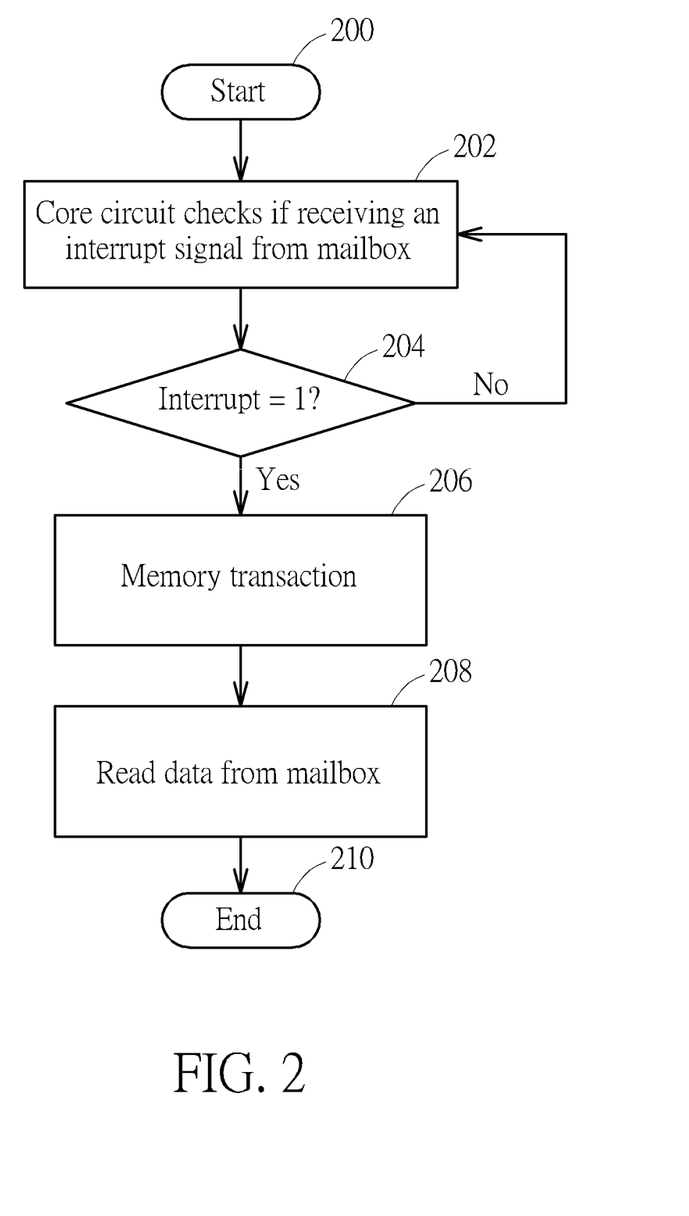
FIG. 2 is a flowchart of an operation of the core circuit shown in FIG. 1 according to one embodiment of the present invention.

FIG. 2 is a flowchart of an operation of the core circuit 112/122 according to one embodiment of the present invention. Referring to the embodiment shown in FIG. 1 together, the flow is described as follows.

Step 200: the flow starts.

Step 202: the core circuit checks if receiving an interrupt signal from the corresponding mailbox.

Step 204: if the core circuit receives the interrupt signal (i.e. interrupt=1), the flow enters Step 206; if the core circuit does not receive the interrupt signal (i.e. interrupt=0), the flow goes back to Step 202.

Step 206: the core circuit performs the memory transaction with the level one memory interface and the mailbox.

Step 208: the core circuit reads the command stored in the mailbox via the level one memory interface.

Step 210: the flow finishes.

Figure 3:
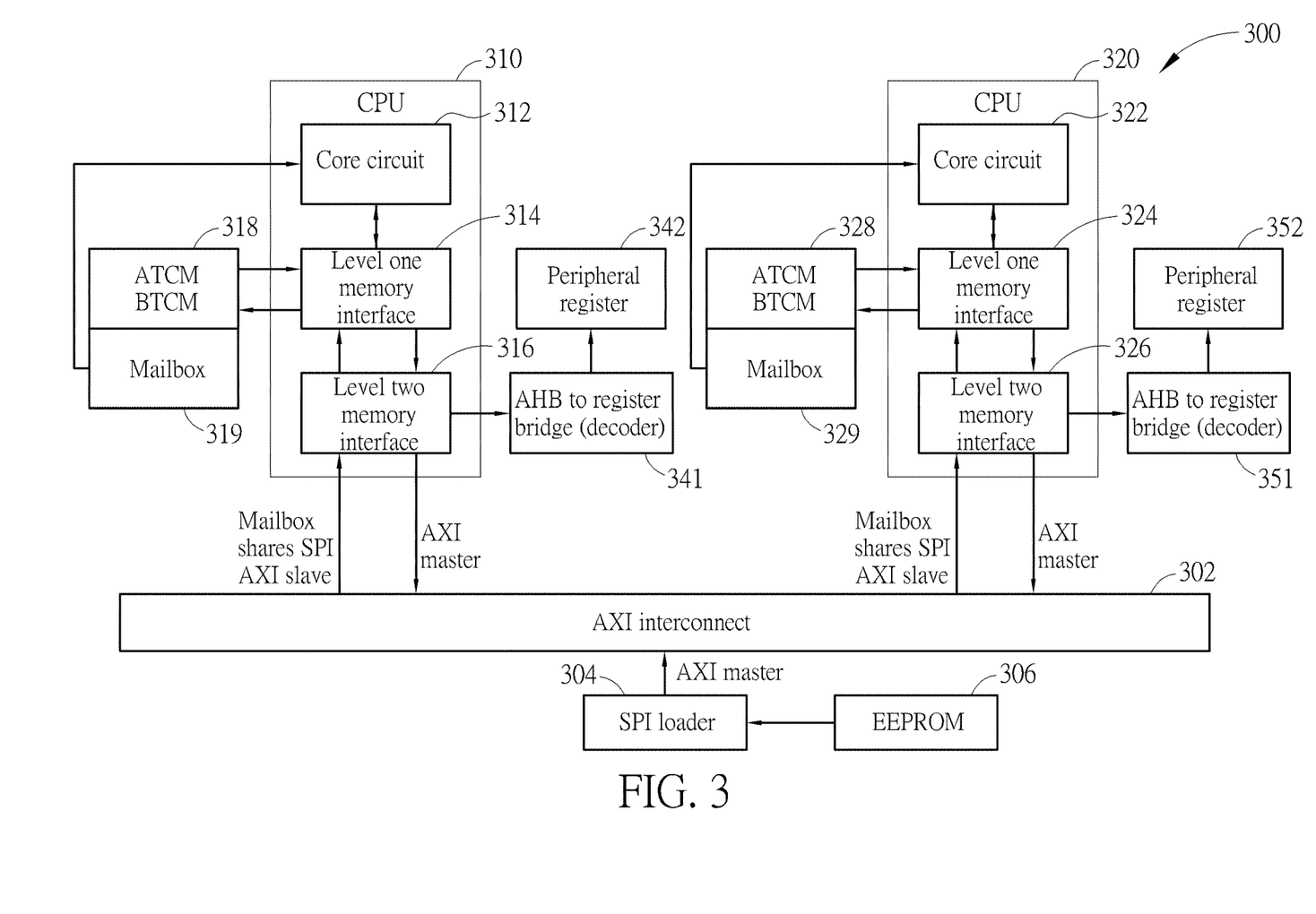
FIG. 3 is a diagram illustrating a SoC according to another embodiment of the present invention.

In the SoC 100 shown in FIG. 1, there are two AXI masters and four AXII slaves, and a frequency of the SoC 100 may be limited because the highest frequency of the AXI interconnect 102 is inversely proportional to a number of AXI masters and AXI slaves. Therefore, in order to increase the frequency of the system, FIG. 3 shows a SoC 300 according to one embodiment of the present invention. As shown in FIG. 3, the SoC 300 comprises a CPU 310, a tightly-coupled memory (TCM) comprising a memory space named ATCM and BTCM 318 and a mailbox 319, an AHB to resistor bridge 341 and a peripheral register 342, wherein the CPU 310 comprises a core circuit 312, a level one memory interface 314 and a level two memory interface 316. In addition, the SoC 310 further comprises a CPU 320, a TCM comprising a memory space named ATCM and BTCM 328 and a mailbox 329, an AHB to resistor bridge 351 and a peripheral register 352, wherein the CPU 320 comprises a core circuit 322, a level one memory interface 324 and a level two memory interface 326. In this embodiment, the TCM is designed to provide low latency memory that can be used by the processor without the unpredictability that is a feature of caches, and the TCM can be directly accessed by the core circuit 312/322 through the level one memory interface 314/324 without going through the level two memory interface 316/326.

In the operation of the SoC 300, when the SoC 300 is powered on from a power-off state, a SPI (Service Provider Interface) loader 304 loads program codes from an electrically-erasable programmable read-only memory (EEPROM) 306, and the SPI loader 304 writes the program codes into the ATCM of the CPU 310/320 via the AXI interconnect 302, the level two memory interface 316/326 and the level one memory interface 314/324, then the CPUs 310 and 320 are enabled. In the above initialization step, because the SPI loader 302 only works when the SoC 300 is powered on, the SPI AXI slave can be used by the CPU 310/320 for communicating with the mailbox 329/319 via the AXI interconnect 302 after the SoC 300 is initialized.

In the SoC 300, the core circuit 312 can directly access the ATCM and BTCM 318 and the mailbox 319 via the level one memory system 314, but the core circuit 312 needs to access the peripheral register 342 via the level two memory interface 316, and the level two memory interface 316 is required for the core circuit 312 to access the other components via the AXI interconnect 302. In this embodiment, the level two memory interface 316 may be an AHB interface that performs protocol conversion and address mapping, wherein the protocol conversion and address mapping mean a longer signal delay. Therefore, by designing the mailbox 319 within the TCM that can be directly accessed by the core circuit 312, the CPU 310 can communicate with other components with higher efficiency. Similarly, the core circuit 322 can directly access the ATCM and BTCM 328 and the mailbox 329 via the level one memory system 324, but the core circuit 322 needs to access the peripheral register 352 via the level two memory interface 326, and the level two memory interface 326 is required for the core circuit 322 to access the other components via the AXI interconnect 302. In this embodiment, the level two memory interface 326 may be the AHB interface that performs protocol conversion and address mapping, wherein the protocol conversion and address mapping mean a longer signal delay. Therefore, by designing the mailbox 329 within the TCM that can be directly accessed by the core circuit 322, the CPU 320 can communicate with other components with higher efficiency.

Specifically, if the CPU 320 needs to send a command to the CPU 310, the core circuit 322 sends the command to the AXI interconnect 302 via the level one memory interface 324 and the level two memory interface 326, and the command from the CPU 320 is stored in the mailbox 319 via the layer two memory interface 316 and the level one memory interface 314. After the mailbox 319 receives the command from the CPU 320, the mailbox 319 sends an interrupt signal to notify the core circuit 312. After receiving the interrupt signal from the mailbox 319, the core circuit 312 reads the command stored in the mailbox 319 via the level one memory interface 314 to perform an operation corresponding to the command. In this embodiment, because the level one memory interface 314 does not need any register for the core circuit 312 to access the mailbox 319, the core circuit 312 can obtain the command from the CPU 320 efficiently. Similarly, if the CPU 310 needs to send a command to the CPU 320, the core circuit 312 sends the command to the AXI interconnect 302 via the level one memory interface 314 and the level two memory interface 316, and the command from the CPU 310 is stored in the mailbox 329 via the level two memory interface 326 and the level one memory interface 324. After the mailbox 329 receives the command from the CPU 310, the mailbox 329 sends an interrupt signal to notify the core circuit 322. After receiving the interrupt signal from the mailbox 329, the core circuit 322 reads the command stored in the mailbox 329 via the level one memory interface 324 to perform an operation corresponding to the command. In this embodiment, because the level one memory interface 324 does not need any register for the core circuit 322 to access the mailbox 329, the core circuit 322 can obtain the command from the CPU 310 efficiently.

Figure 4:
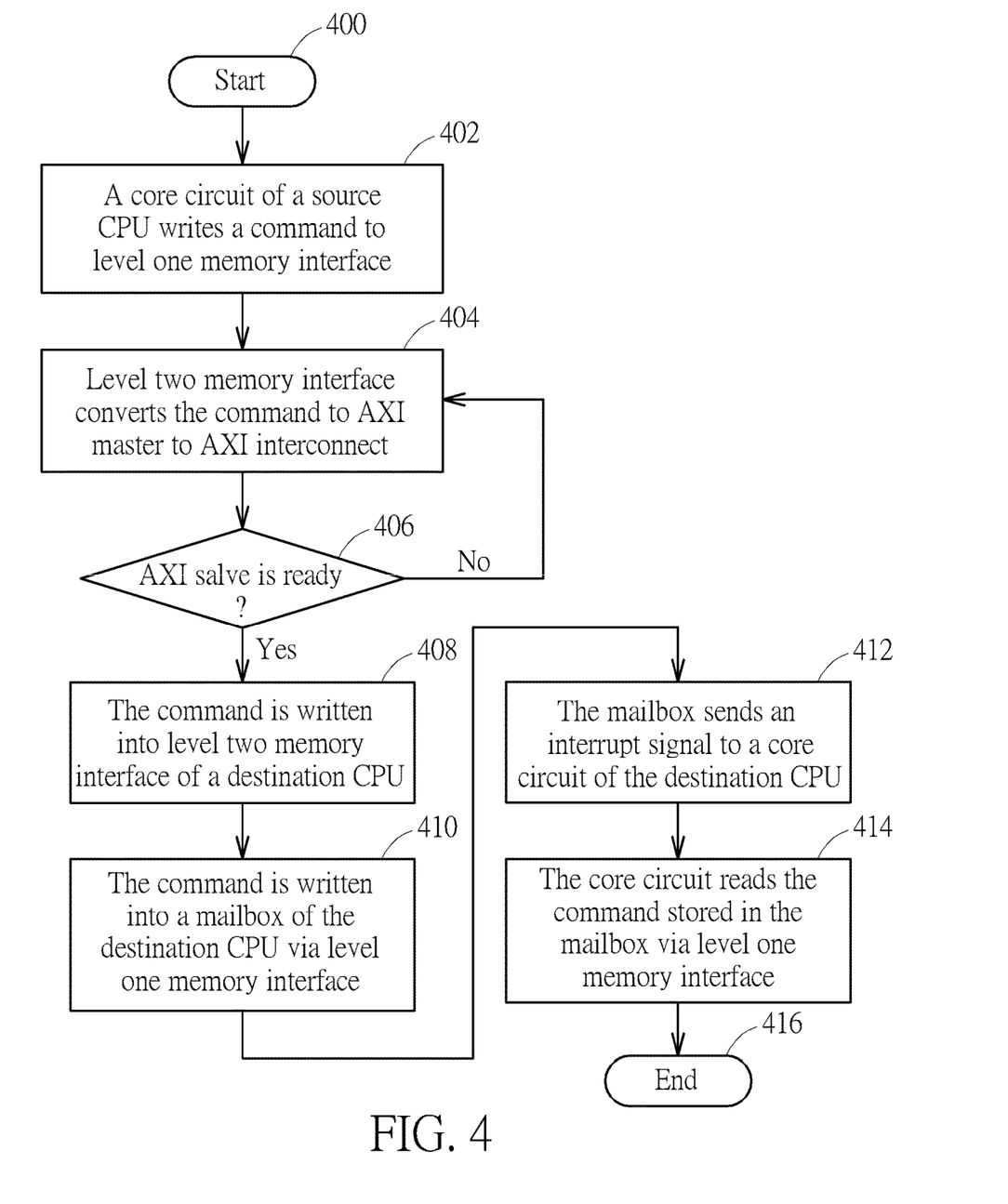
FIG. 4 is a flowchart of an operation of the core circuit shown in FIG. 3 according to one embodiment of the present invention.

FIG. 4 is a flowchart of an operation of the core circuit 312/322 according to one embodiment of the present invention. Referring to the embodiment shown in FIG. 3 together, the flow is described as follows.

Step 400: the flow starts.

Step 402: core circuit of a source CPU writes a command to the level one memory interface.

Step 404: level two memory interface converts the command to AXI master to the AXI interconnect.

Step 406: if the AXI salve is ready, the flow enters Step 408; if the AXI salve is not ready, the flow goes back to Step 404.

Step 408: the command is written into the level two memory interface of the destination CPU.

Step 410: the command is written into the mailbox of the destination CPU via the level one memory interface.

Step 412: the mailbox sends an interrupt signal to the core circuit of the destination CPU.

Step 414: the core circuit reads the command stored in the mailbox via the level one memory interface.

Step 416: the flow finishes.

In the embodiment shown in FIG. 3 and FIG. 4, because the interfaces between the mailboxes 319/329 and the AXI interconnect 302 are removed, the number of the AXI slaves becomes less. Therefore, the complexity of the AXI interconnect 302 can be reduced to increase the frequency of the SoC 300.

Figure 5:
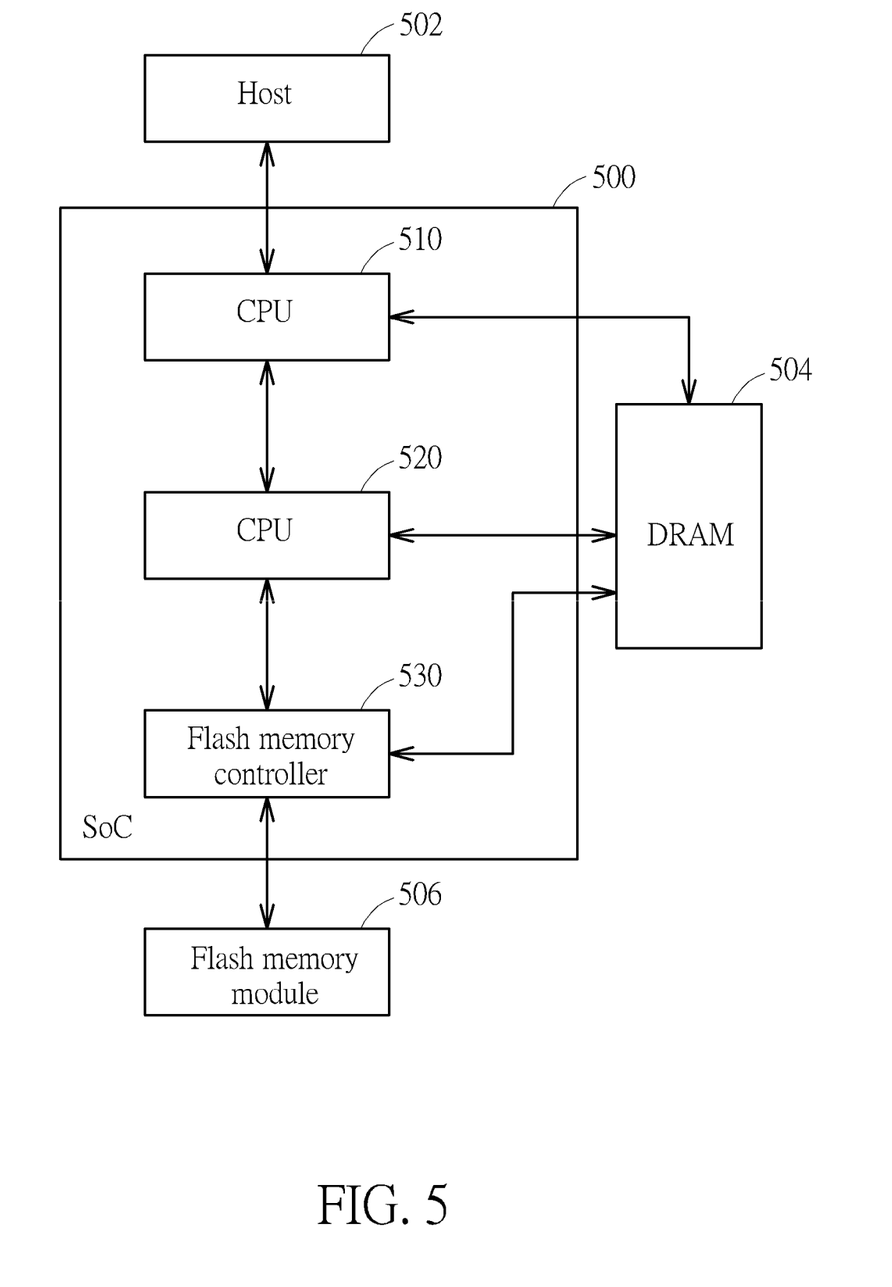
FIG. 5 is a diagram illustrating a SoC according to another embodiment of the present invention.

FIG. 5 is a diagram illustrating a SoC 500 according to another embodiment of the present invention. As shown in FIG. 5, the SoC 500 comprises CPUs 510 and 520 and a flash memory controller 530, wherein the SoC 500 is coupled to a host 502, a dynamic random access memory (DRAM) and a flash memory module 506. In this embodiment, the SoC 500 is used in a solid state drive (SSD), and the SSD may be applied to any appropriate electronic device such as a server. Taking the server comprising the SoC 500 as an example, the host 502 may be a processor within the server.

The CPU 510 shown in FIG. 5 may be implemented by the CPU 110/310, and the CPU 520 may be implemented by the CPU 120/320, that is the mailbox of the CPU 510 is designed in the TCM, and the command from the CPU 320 is stored in the mailbox that can be directly accessed by the core circuit of the CPU 510 without performing any protocol conversion. Similarly, the mailbox of the CPU 520 is designed in the TCM, and the command from the CPU 510 is stored in the mailbox that can be directly accessed by the core circuit of the CPU 520 without performing any protocol conversion.

In the embodiment shown in FIG. 5, the CPU 510 is configured to perform the host-related operations, and the CPU 520 is configured to perform the operations related to the flash memory controller 530. Specifically, when the host 502 sends an access command (hereafter, a write command serves as the access command) and corresponding data to the SoC 500, the CPU 510 writes the received data into the DRAM 504 and sends a command corresponding to the received write command to the mailbox of the CPU 520, wherein the command sent by the CPU 510 may comprise a write instruction and logical addresses of the data. Then, the CPU 520 obtains the command stored in the mailbox, and the CPU 520 refers to the command to control the flash memory controller 530 to write the data into the flash memory module 506. In one embodiment, the CPU 520 may read the data from the DRAM 504, then the data with a write command are sent to the flash memory controller 530. In another embodiment, the CPU 520 may send a write command with the logical addresses of the data to the flash memory controller 530, then the flash memory controller 530 obtains the data from the DRAM 504 based on the received logical addresses of the data.

Briefly summarized, in the SoC of the present invention, by designing the mailbox in the level one memory system (i.e. tightly-coupled memory), the CPU can read the command from the mailbox without protocol conversion, that is the CPU can read the command from the mailbox efficiently.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system on chip (SoC), comprising:
a first central processing unit (CPU), wherein the first CPU comprises a first core circuit, a first level one memory interface and a first level two memory interface;
a first tightly-coupled memory, wherein the first tightly-coupled memory is directly coupled to the first level one memory interface, and the first tightly-coupled memory comprises a first mailbox;
a second CPU, wherein the second CPU comprises a second core circuit, a second level one memory interface and a second level two memory interface; and
a second tightly-coupled memory, wherein the second tightly-coupled memory is directly coupled to the second level one memory interface, and the second tightly-coupled memory comprises a second mailbox;
wherein when the first CPU sends a command to the second mailbox within the second tightly-coupled memory, the second core circuit directly reads the command from the second mailbox, without going through the second level two memory interface;
wherein the SoC further comprises a bus for communications between the first CPU and the second CPU, the second level two memory interface and the second level one memory interface are required for the second core circuit to access the first CPU and the first tightly-coupled memory via the bus, and the second level one memory interface does not directly couple to the bus; and the second level two memory interface executes a protocol conversion when data goes through, and the second level one memory interface does not execute any protocol conversion while the second core circuit reads the second mailbox.

2. The SoC of claim 1, wherein the second mailbox is coupled to the bus, and the first CPU sends the command to the second mailbox within the second tightly-coupled memory, without passing through the second level one memory interface and the second level two memory interface.

3. The SoC of claim 1, the first CPU sends the command to the second mailbox within the second tightly-coupled memory via the second level two memory interface and the second level one memory interface.

4. The SoC of claim 3, wherein the second mailbox does not directly couple to the bus.

5. The SoC of claim 4, wherein when the SoC is powered on, a loader reads program codes from a read-only memory and writes the program codes to the first tightly-coupled memory and the second tightly-coupled memory via the loader, the second level two memory interface and the second level one memory interface, to complete an initialization step of the SoC; and after the initialization step finishes, the loader does not use the bus, and the first CPU sends the command to the second mailbox within the second tightly-coupled memory via an interface of the bus that is previously occupied by the loader, the second level two memory interface and the second level one memory interface.

6. A system on chip (SoC), comprising:
a first central processing unit (CPU), wherein the first CPU comprises a first core circuit, a first level one memory interface and a first level two memory interface;
a first tightly-coupled memory, wherein the first tightly-coupled memory is directly coupled to the first level one memory interface, and the first tightly-coupled memory comprises a first mailbox;
a second CPU, coupled to the first CPU, wherein the second CPU comprises a second core circuit, a second level one memory interface and a second level two memory interface; and
a second tightly-coupled memory, wherein the second tightly-coupled memory is directly coupled to the second level one memory interface, and the second tightly-coupled memory comprises a second mailbox;
a flash memory controller, coupled to the second CPU, configured to access a flash memory module external to the SoC;
wherein when first CPU sends an access command to the second mailbox within the second tightly-coupled memory, the second core circuit directly reads the access command from the second mailbox, without going through the second level two memory interface; and the second core circuit further sends a command corresponding to the access command to the flash memory controller, for controlling the flash memory controller to access the flash memory module;
wherein the SoC further comprises a bus for communications between the first CPU and the second CPU, the second level two memory interface and the second level one memory interface are required for the second core circuit to access the first CPU and the first tightly-coupled memory via the bus, and the second level one memory interface does not directly couple to the bus; and the second level two memory interface executes a protocol conversion when data goes through, and the second level one memory interface does not execute any protocol conversion while the second core circuit reads the second mailbox.

7. The SoC of claim 6, wherein the second mailbox is coupled to the bus, and the first CPU sends the command to the second mailbox within the second tightly-coupled memory, without passing through the second level one memory interface and the second level two memory interface.

8. The SoC of claim 6, the first CPU sends the command to the second mailbox within the second tightly-coupled memory via the second level two memory interface and the second level one memory interface.

9. The SoC of claim 8, wherein the second mailbox does not directly couple to the bus.

10. The SoC of claim 9, wherein when the SoC is powered on, a loader reads program codes from a read-only memory and writes the program codes to the first tightly-coupled memory and the second tightly-coupled memory via the loader, the second level two memory interface and the second level one memory interface, to complete an initialization step of the SoC; and after the initialization step finishes, the loader does not use the bus, and the first CPU sends the command to the second mailbox within the second tightly-coupled memory via an interface of the bus that is previously occupied by the loader, the second level two memory interface and the second level one memory interface.

* * * * *